Dec. 14, 1926.
A. H. SCHLAF
1,610,616
ELECTRIC WELDING APPARATUS
Filed Oct. 21, 1921 4 Sheets-Sheet 1
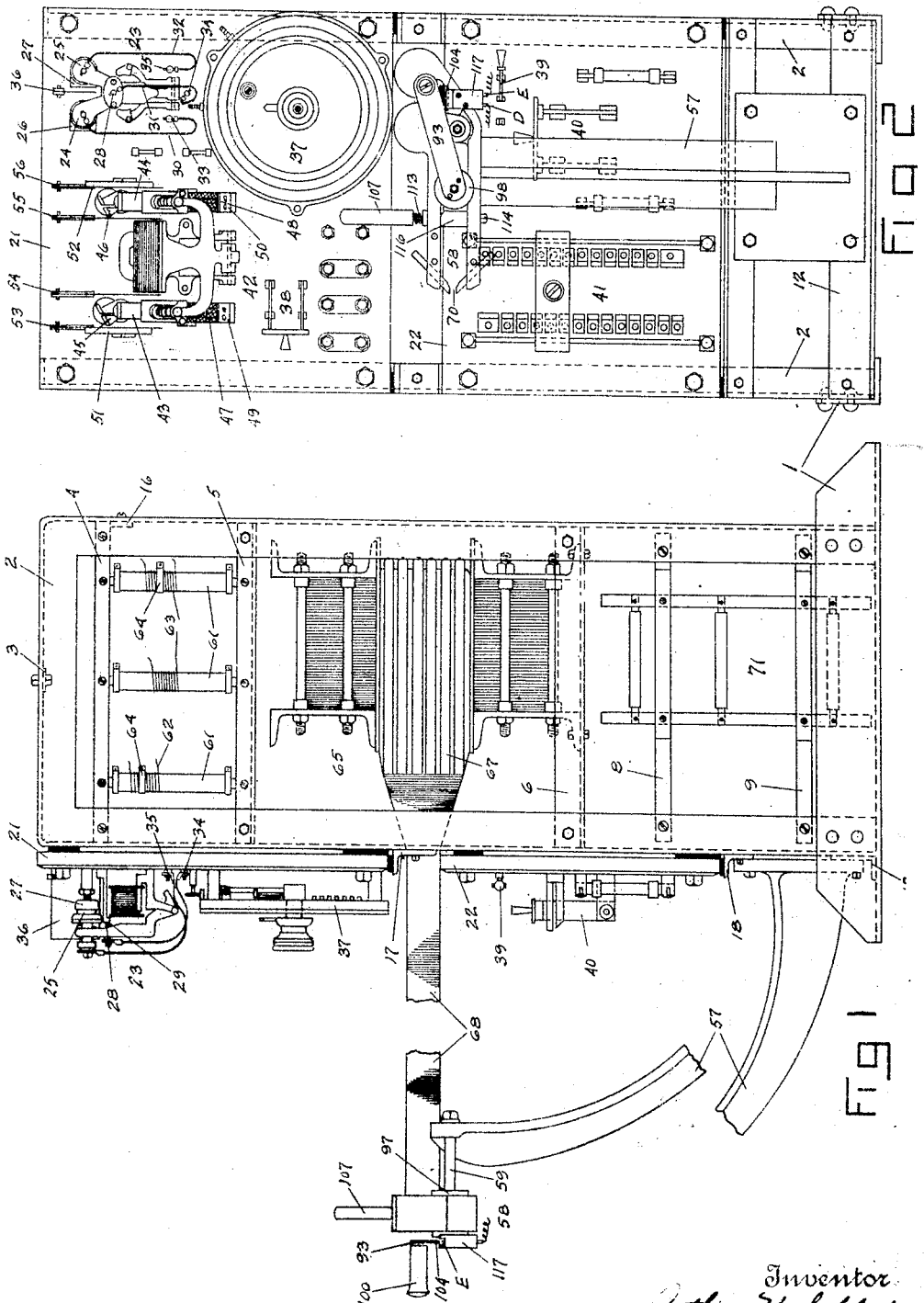

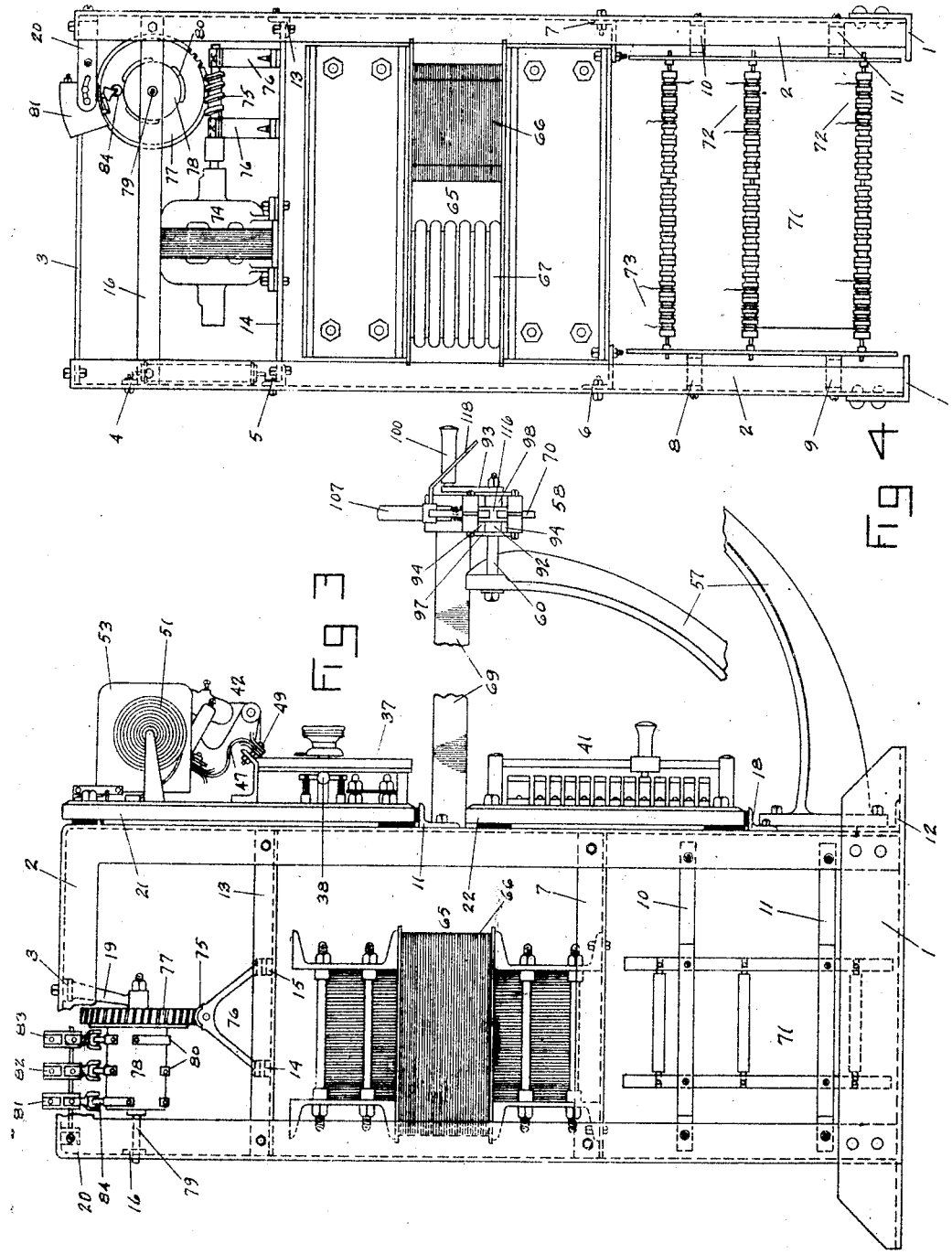

Dec. 14, 1926.
A. H. SCHLAF
ELECTRIC WELDING APPARATUS
Filed Oct. 21, 1921      4 Sheets-Sheet 3
1,610,616
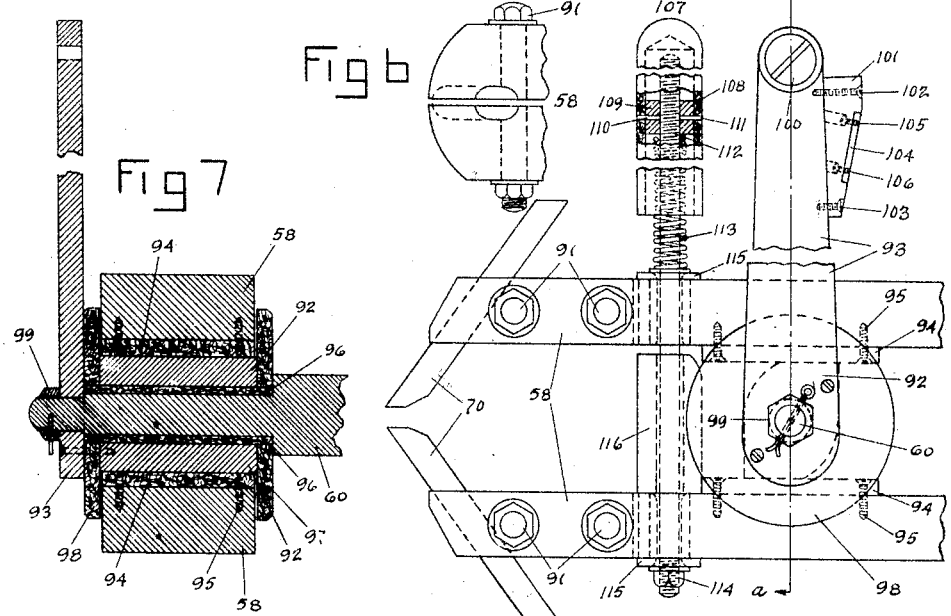
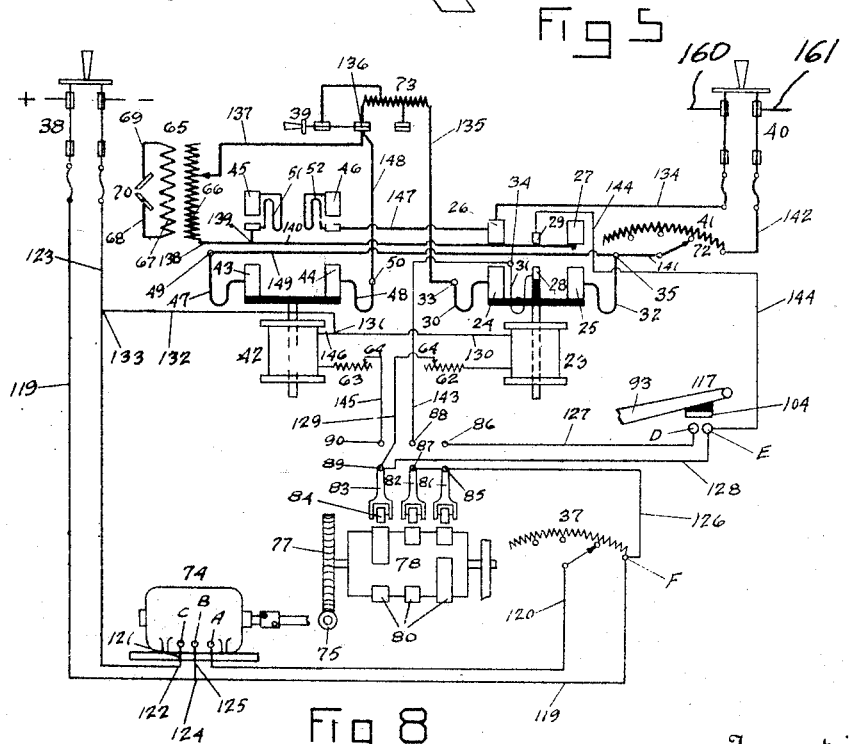
Inventor
Arthur H. Schlaf
By his Attorney L. H. Campbell Dec. 14, 1926.

A. H. SCHLAF 1,610,616

ELECTRIC WELDING APPARATUS

Filed Oct. 21, 1921    4 Sheets-Sheet 4

Patented Dec. 14, 1926.

1,610,61[?]

UNITED STATES PATENT OFFICE.

ARTHUR H. SCHLAF, OF YONKERS, NEW YORK, ASSIGNOR TO OTIS ELEVATOR COMPANY, OF JERSEY CITY, NEW JERSEY, A CORPORATION OF NEW JERSEY.

ELECTRIC WELDING APPARATUS.

Application filed October 21, 1921. Serial No. 509,223.

My invention relates to an improvement in electric welding machines, particularly of the spot welding type, as used more especially for welding the end rings to the rotor bars of an induction motor of the squirrel cage type, and has for its object, among others, the provision of improved and efficient means for automatically controlling the operation of welding. To these and other ends appearing hereinafter, my invention consists, substantially, in the construction, relative arrangement and combination of parts, constituting an electric welding machine, all as more fully set forth in the following specification, and as shown in the drawings accompanying the same, and as finally pointed out in the appended claims.

Referring to the drawings:

Figure 1 is an elevation view of one of the sides of the machine.

Figure 2 is a front elevation of the machine.

Figure 3 is a view in elevation of another side of the machine.

Figure 4 is a rear elevation of the machine.

Figure 5 is an enlarged fragmentary elevation view of the welding jaws, shown in Figure 2; also an enlarged fragmentary sectional elevation view, part of which is shown in detail, of the pressure device.

Figure 6 is a fragmentary plan view of the upper jaw of Figure 5, the lower jaw is constructed the same as the upper jaw.

Figure 7 is a sectional end view of a part of Figure 5, on the line $a$—$a$.

Figure 8 is a diagram of the electrical system of circuits.

Like reference characters denote similar parts throughout the various figures.

Figure 9:
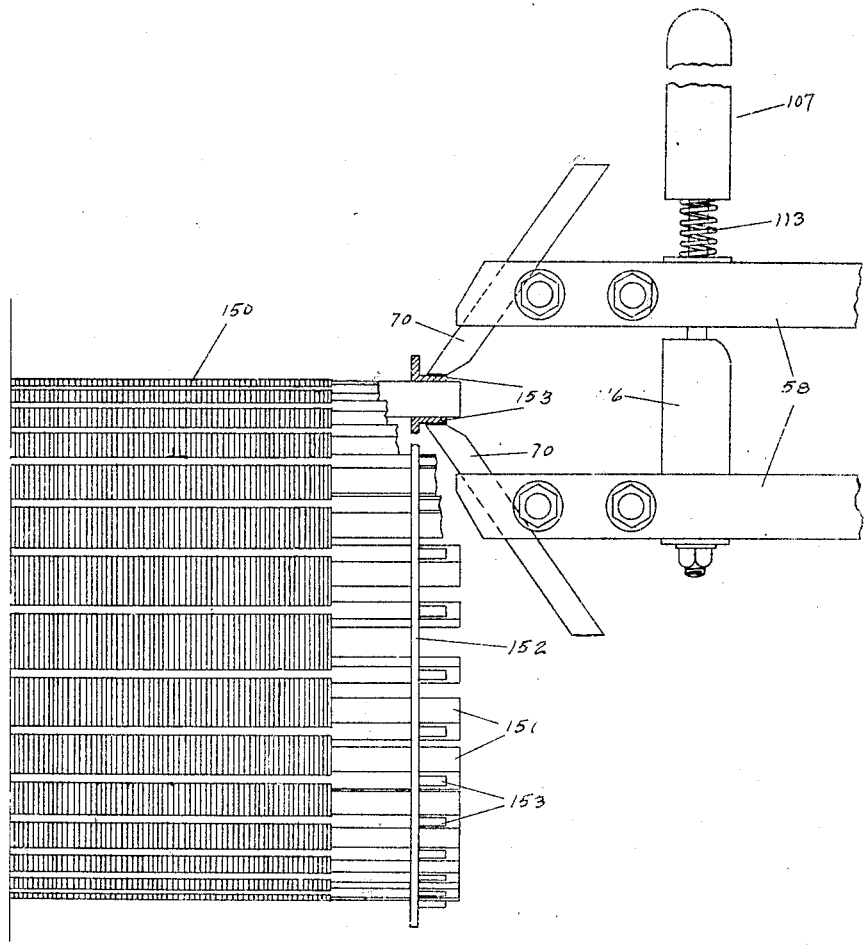
Figure 9 is a fragmentary elevation view of the welding jaws, electrodes, pressure device, rotor bars and end rings of a rotor of an induction motor of the squirrel cage type.

Referring to Figures 1, 2, 3 and 4, the base supports of the machine are designated by the numeral, 1. To these supports are rigidly fastened the frame, 2, of the machine. To the frame, 2, are fastened crosspieces, 3 to 16 inclusive, and brackets, 17, 18, 19 and 20, which support the various other parts of the machine, as described later on, also the upper and lower slate panels, 21 and 22, upon which are mounted the various switches and controlling devices.

As shown in Figures 1 and 2, there is mounted upon the upper panel, 21, a two-prong switch, 23, of the electro-magnet type, the prongs carrying the contacts, 24 and 25, which have contact engagement with contacts, 26 and 27, mounted on the panel. Secured to the switch, between its prongs, is another contact, 28, and it has contact engagement with another contact, 29, on the panel. To the contacts on the switch is fastened one end of the conductor cables, 30, 31 and 32, the other ends of which are secured to terminals, 33, 34 and 35, on the panel, 21. For the purpose of confining the electric arc made by the opening of the switch when the machine is in operation, there is inserted between the contacts on the prongs, an arc deflector, 36. A rotary rheostat, 37, of standard manufacture, is mounted on the upper panel; and also a knife switch, 38. On the lower panel, 22, are two more knife switches, 39 and 40, and a vertical sliding rheostat, 41; all of which parts are for the purpose hereinafter explained.

Still referring to Figures 2 and 3, there is mounted upon the upper panel, 21, another two-prong switch, 42, of the electro-magnet type, the prongs carrying contacts, 43 and 44, which have contact engagement with contacts, 45 and 46, mounted on the panel. To the contacts on the switch is fastened one end of the flexible copper conductor strips, 47 and 48, the other ends of which are secured to terminals, 49 and 50, on the panel. The switch is provided with blow-out coils, 51 and 52, and arc deflectors, 53, 54, 55 and 56; the purpose of which parts respectively is to diminish and confine the arcs caused by the opening of the contacts of the switch when in operation.

Referring again to Figures 1, 2 and 3, the bracket, 18, is a crosspiece, and is fastened to the front of the frame of the machine, and the crosspiece, 12, is also secured to the front of the frame, beneath the bracket; a curved forwardly projecting support arm, 57, is fastened at its lower end to the bracket, 18, and crosspiece, 12, and carries at its upper end welding jaws, 58, fastened thereto by means of a hinge pin, 59, and a cam pin, 60.

Referring again to Figure 1, there are lava resistance tubes, 61, fastened to the crosspieces, 4 and 5, which latter are secured across one side of the frame and upon the tubes alloy electrical resistance wires, 62 and 63, are wound, and connected to the coils of the electro-magnet switches, 23 and 42, see Figure 8. An adjusting band, 64, is also secured to two of the tubes, which has sliding movement upon the wire on the surface of the tube, and whose position upon the tube fixes the amount of resistance in the circuit to the switches, 23 and 42, needed to regulate the proper amount of current to operate the switches.

Referring again to Figures 1, 3 and 4, the crosspieces, 6 and 7, are fastened on opposite sides of the frame of the machine, on which is mounted a transformer, 65, of a primary winding, 66, and secondary winding, 67, which latter is connected to the welding jaws by conductor leads, 68 and 69, and by the jaws, to the electrodes, 70. The leads, 68 and 69, of the secondary of the transformer are connected to the welding jaws, and are bunched together and wound around as a whole by a winding cord, as indicated in the Figures 1 and 3.

The crosspieces, 8, 9, 10 and 11, are secured to the frame on its opposite sides, and to them is fastened an electrical resistance frame, 71. Upon the frame is wound an alloy wire, 72, which is used in conjunction with the vertical rheostat, 41, as a resistance means for regulating the current to the welding electrodes, 70, which latter, as shown, are mounted in the jaws. Also on the frame, there is wound an alloy wire, 73, which is used in conjunction with the knife switch, 39, as a resistance means for regulating the current to the primary winding, 66, of the transformer, 65.

Referring again to Figures, 3 and 4, the crosspiece, 13, is fixed to one side of the frame, and to this crosspiece, are bolted the crosspieces, 14 and 15, which are also mounted on the crosspiece, 5, on the opposite side of the frame, and on which crosspieces, 14 and 15, is supported a direct current electric motor, 74. To the motor is coupled a worm shaft, 75, which is supported in the pedestals, 76, which in turn are fastened to the crosspieces, 14 and 15. The worm shaft, 75, meshes with a gear, 77, to which a drum, 78, is fastened. Both gear and drum rotate on a shaft, 79, which is supported at one end by the crosspiece, 16, secured to the frame, and at the other end by the bracket, 19, which is fastened to the crosspiece, 3, on the top of the frame. Mounted on the drum, 78, are three sets of pads or cams, 80. There is a bracket, 20, fastened to the frame, on which is mounted three switches, 81, 82 and 83. These switches are equipped with rollers, 84, which are adapted to have mechanical contact engagement with the cams on the drum. When the rollers rest on the cams, 80, the electrical contacts, 85, 86, 87, 88, 89 and 90, Figure 8, of the switches are open, and when the rollers roll off the cams, by virtue of the turning of the drum, the switches are closed. The construction of the contacts of the switches is not shown, but their relative arrangement with each other is indicated in Figure 8. Further explanation of this device will be given in the operation of the machine.

Referring to Figure 5, it shows a view of the welding jaws, 58, which are of pure cast copper, or any other suitable electrical conductor. As stated heretofore, the jaws are fastened to the support arm, 57, by the cam pin, 60, and the hinge pin, 59. The cam pin is insulated from the jaws, as shown in Figure 7. The hinge pin is insulated in a similar manner, but its insulation is not shown. The electrodes, 70, may be of pure copper also, and are held in place by bolts, 91.

Again referring to Figures 5 and 7, there is, on the cam pin, a cam, 92, to which is fastened one end of a lever, 93. The cam has a bearing on fibre plates, 94, fastened to the welding jaws by screws, 95. The plates also serve to insulate electrically the cam from the jaws. The cam is also insulated from the cam pin by a fibre bushing, 96, and a fibre washer, 97, and from the lever, 93, by a fibre washer, 98, all as shown in Figure 7. The lever, 93, is mounted on the cam pin, 60, and held in place by a nut, 99, through which there is a cotter pin inserted to prevent turning movement of the nut in the movement of the lever. To the lever is affixed a handle, 100, also a fibre block, 101, is secured to the lever by the screws, 102 and 103. To the block is fastened a brass segment, 104, by the screws, 105 and 106. The purpose of this segment will be explained later, which functions through the manual operation of the lever. A turning movement of the lever to the right causes the cam likewise to turn, the two parts being fastened together, as stated before, which allows the jaws to come together, and an opposite turning movement will cause the jaws to separate from each other, as will be now explained.

In connection with the operation of the welding jaws, I employ a pressure device, 107, which comprises a fibre handle, 108, cored out, and into which is inserted a metal block, 109, which is held in place by escutcheon pins, 110 and 111. The block is threaded to engage with a stud, 112, which is also threaded. In connection with the device, is a spring, 113, placed over the stud, 112, and made to bring pressure on the upper jaw by virtue of its contact with the block, 109, in the handle, 108, the amount of pressure being governed by the turning of the handle, 108. The stud is also threaded at its other end, and fastened to the lower jaw by means of a nut, 114. The stud passes through both jaws, as will be seen, and is insulated from them by means of fibre bushings, 115, the ends being shown in full lines and the body portion in dotted lines. The stud also serves to hold in place a fibre block, 116, placed between the jaws, and through which the stud passes and which is employed as a stop to the closing movement of the jaws.

Upon the lower jaw is mounted an electric switch, 117, with two contacts, D and E, see Figures 1, 2 and 8, which contacts are bridged by the brass segment, 104, fastened to, and insulated from, the lever, 93, as already stated, through the closing of the lever. The contacts are adapted to comprise a part of an electrical circuit, which will be referred to later on.

Affixed to the handle, 108, of the pressure device, is a pane of glass, secured in a frame, 118, see Figure 3, and its object is to protect or shield the operator's eyes while in the course of performing a weld.

With this general description, I will now describe the various parts more in detail, and at the same time point out their operation and the electrical circuits associated therewith.

Referring to Figure 8, it is assumed that the knife switch, 38, is closed, as shown, through which there is obtained a direct current from a supply source, which is used to operate the motor, 74, and the electromagnet switches, 23 and 42. The circuit may be traced from the plus main of switch 38, by the conductor 119, to a terminal F, and thence through the resistance of the rheostat, 37, through the conductor, 120, to a terminal A, and thence to the armature of the motor, 74, and from the armature of the motor to the terminal, C, and from there by the conductor, 121, junction point, 122, by the conductor, 123, to the switch, 38, to the minus main. The field of the motor receives current from the conductor, 119, junction point, 124, and conductor, 125, to the terminal, B, and then through the field, to the terminal, C, and then to the conductor, 121, junction point, 122, by the conductor, 123, to the switch, 38, to the minus main. The closing of the switch, 38, starts the motor, 74, and it in turn causes the drum, 78, to rotate by virtue of its being geared to the motor, as already stated. By adjusting the rheostat, 37, the amount of current to the motor is regulated, and thereby the speed of the motor, and through it, the drum, controlled.

It will now be assumed that the knife switch, 40, also is closed, as shown, through which there is obtained a single phase alternating current supply which is used for the welding operation.

Going back to Figure 5, it will be assumed that the electrodes, 70, are apart from each other sufficiently to allow the placing of the object to be welded between their contact points.

The article to be welded having been placed between the contact points of the electrodes, they are now made to clamp the object between them, by allowing the jaws to close thereon, by virtue of moving the lever, 93, to the right, whereupon the jaws are forced toward each other upon the object, by the pressure of the spring, 113. Referring again to Figure 8, the said movement of the lever, 93, to its extreme throw causes the brass segment, 104, attached to it, to engage contacts, D and E, of the switch, 117. In the Figure 8, I have shown the lever away from the contacts, D and E. In further explanation of the operation of the machine, it will be assumed that the segment attached to the lever is engaged with the contacts, D and E. A circuit may be traced from the plus main of switch, 38, by the conductor, 119, to the terminal, F, and thence by a conductor, 126, to the contact, 85, on the arm of the switch, 81. The drum being in motion, at the time in question, it will cause the switch, 81, to roll off of its cam, 80, and close together its contacts, 85 and 86, see Figure 8. Upon the closing of these contacts, 85 and 86, the circuit may be further traced from the contact, 86, to the conductor, 127, to the contact, D, across the segment, 104, of the lever, 93, to the contact, E, and from thence by the conductor, 128, to the contact, 89, on the arm of switch, 83, by the conductor, 129, through the resistance, 92, through the coil of the electro-magnet switch, 23, by the conductor, 130, to the junction point, 131, to the conductor, 132, to the junction point, 133, by the conductor, 123, to the switch, 38, to the minus main. The operating circuit of the electro-magnet switch, 23, being now completed, the switch operates to raise its core, thereby closing the circuit to the primary winding, 66, of the transformer, 65. The circuit may be traced from main 160 at the knife switch, 40, by the conductor, 134, through the contacts, 26 and 24, of the switch, 23, by the conductor cable, 30, to the terminal, 33, by the conductor, 135, to the resistance, 73, through the resistance, 73, to the junction point, 136, of the knife switch, 39, by the conductor, 137, to the primary winding, 66, of the transformer, and from the primary winding, 66 by the conductor, 138, the junction point, 139, by the conductor, 140, through the contacts 27 and 25, of the switch, 23, by the conductor cable, 32, to the terminal, 35, by the conductor, 141, to the resistance, 72, of the rheostat, 41, through the resistance, 72, by the conductor, 142, to the switch, 40, to main 161. Through the circuit just traced a small amount of current is allowed to pass through the primary of the transformer, 65. The current through that circuit is regulated by changing or adjusting the resistance, 73, by means of the knife switch, 39, so that the article to be welded, placed between the contact points of the electrodes, 70, may be raised to the proper temperature, before the welding current is applied. With the aid of the pressure of the spring of the pressure device, 107, upon the jaws, and hence, upon the electrodes, and through them, upon the object between them, a good electrical contact will be made between the electrodes and the article to be welded, which is desirable and necessary when the high welding current shall be applied and passed through the electrodes and the said object, in order to obtain a good weld.

I believe that the practice of subjecting the article to be welded between the jaws to the proper heat before applying the welding current which performs the welding, is new with me.

The contacts, 85 and 86, of the switch, 81, are closed for a short period of time only, in the operation of the machine, as indicated in the drawing, by the brief space between its cams, 80, on the drum, 78. The contacts, 87 and 88, of the switch, 82, close at the same time as the contacts of switch, 81, close. The circuit for the switch, 82, may be traced from the positive main of switch, 38, by the conductor, 119, to the terminal, F, and conductor, 126, to the contact, 85, of switch, 81, and contact, 87, of switch, 82. The latter being now closed, as already stated, the circuit may be further traced from the contact, 88, of the switch, 82, to the conductor, 143, to the terminal, 34, by the conductor cables, 31, through the contacts 28 and 29, of the switch, 23, which is also closed at this time, by the conductor, 144, to the contact, E, of switch, 117, by the conductor, 128, to the contact, 89, of switch 83, to conductor, 129, through the resistance, 62, the coil of switch 23, by the conductor 130, junction point 131, conductor 132, junction point 133, to the conductor 123, to the switch 38, to the minus main. It will be remembered that, at this time, the contacts of switch, 81, are open.

The bridging of the segment, 104, of the lever, 93, across the contacts, D and E, of the switch, 117, may be made by bringing the segment down on the contacts for a moment only, but the bridging operation must be made at the time when the switch, 81, closes its contacts, 85 and 86, by virtue of rolling off of its cam, 80, through the rotation of the drum, 78, to obtain one of the steps in the operation of the machine. The bridging of the contacts by the segment at any other time than that in question, will fail to cause the operation spoken of; but by causing the contacts to stay bridged by the segment, 104, by maintaining the lever, 93, in a downward position, until the switch, 81, closes its contacts by virtue of rolling off its cam, 80, as already stated, the operation will be obtained as above described.

The circuit through the contacts, D and E, and through the contacts of the switch, 81, is used only to establish a circuit to the coil, of the switch, 23, to operate its core to close the switch, 23, and the circuit through the contacts of switch, 82, to constitute a circuit for holding the switch, 23, closed.

Further rotation of the drum causes the switch, 83, to close its contacts, 89 and 90, and establish a circuit from the plus main of the switch, 38, by the conductor, 119, terminal, F, and conductor, 126, through contact, 85, of switch 81, through the contacts, 87 and 88, of the switch, 82, by the conductor, 143, to the terminal, 34, by the conductor cable, 31, through the contacts, 28 and 29, of the switch, 23, by the conductor, 144, contact E, and conductor 128, through the contacts, 89 and 90, of switch, 83, by the conductor, 145, through the resistance, 63, through the coil of switch, 42, by the conductor, 146, the junction point 131, by the conductor 132, junction point 133, by the conductor 123, to the switch 38, to the minus main.

The operating circuit of the electro-magnet switch, 42, being now completed, the coil operates to raise its core, with its contacts, 43, 44, 45 and 46, thereby closing them. The closing of the contacts, short-circuits the contacts, 24, 25, 26 and 27, of the switch, 23, and the resistance, 73, by virtue of the circuit established from main 160 at the switch, 40, by the conductor, 134, contact, 26, of the switch, 23, and conductor, 147, through the blowout, 52, contacts, 46 and 44, of the switch, 42, by the flexible conductor strip, 48, to the terminal, 50, by the conductor, 148, junction point, 136, and the conductor, 137, to the primary winding of the transformer, by the conductor, 138, to the junction point, 139, through the blowout, 51, through the contacts, 45 and 43, of the switch, 42, by the flexible conductor strip, 47, to the terminal, 49, by the conductor, 149, to terminal, 33, by the conductor, 141, to the resistance 72, of the rheostat 41, from the resistance by the conductor, 142, to the switch 40, to main 161.

The short-circuiting of the resistance, 73, and the contacts, 24, 25, 26 and 27, of the switch, 23, allows a heavy current to pass through the primary winding of the transformer for the welding operation, and it is regulated to obtain a proper weld of the article by changing the resistance, 72, of the rheostat, 41. It is this current, of large volume in the secondary, 67, of the transformer, that furnishes the high temperature and performs the welding operation upon the article.

Further rotation of the drum causes the switches, 82 and 83, to open, which results in turn to cause the primary circuit of the transformer to be opened, as already virtually explained in describing the closing of that circuit.

When the welding act is completed, the operator will open the switch, 117, and separate the electrodes, and withdraw the article from between them. It will be observed that the opening of the switch, 117, will not affect the operation of the motor, 74, nor the rotation of the drum, 78. The rotating drum, with its cams or pads, 80, to open the switches, 81, 82 and 83, and the spaces between the pads, to allow the switches to be closed, may be referred to as a timing apparatus, that is to say, they operate to define the length of time that the welding current may be suffered to be automatically applied to the welding operation; therefore, it will be perceived that by shortening or lengthening the lineal space between the cams, 80, into which the rollers of the switches, 81, 82 and 83, drop, the switches are caused to be opened or closed, as the case may be, for a longer or shorter time, and hence, the time of supplying the current to the welding electrodes is correspondingly shortened or lengthened.

In the beginning, I stated that the apparatus described herein is of the spot welding type, and is applicable to any kind of work of that nature; but that I desired to apply the machine more especially to welding the end rings and bars together of the rotor of an induction motor of the squirrel cage type. With that object in view, the electrodes are shown set towards each other at an angle, the purpose being to facilitate the placing of the contact points of the electrodes upon the lips formed in the openings in the rings to receive the bars. I will now proceed to describe the machine with its electrodes applied more particularly to welding together the lips of end rings to the rotor bars of a rotor of an induction motor of the squirrel cage type, referring more specifically to the Figure 9.

In this figure I have illustrated the application of my invention to the construction of an induction motor, as has been already said. A section of the core of the rotor of an induction motor is designated by the numeral, 150. The conductors or rotor bars, constituting a squirrel cage winding is designated by the numeral, 151. Several of the bars are cut away further to illustrate the application of the invention. An end ring, which serves to connect the bars together, is designated by the numeral, 152. Connection between the ring and rotor bars is obtained by the openings formed in the ring to receive the bars, as shown in the drawing. The drawing shows a part of the end ring in section, better to illustrate the lips, 153, formed at the openings of the end ring, in which openings the conductor bars are inserted. It will be observed that the lips bear on the bars, and that the electrodes bear on the lips. The electric current, before being conducted to the electrodes, lips and bar, serves to preheat the lips and bar, as it were, as has already been stated, and, the pressure device, pressing the electrodes together upon the lips, effects, as it were, a good mechanical contact between the lips and bar, and, consequently, a good electrical contact between the same, which is desirable to have. Following upon this step, the welding current is now admitted, and effects the welding together of the lips and bar. Of course, it is obvious that the machine may be adapted for welding any other articles, in which other cases, the machine will be modified to suit the operation of welding the article in hand.

Having now described and shown my invention, what I desire to claim is:

1. In welding apparatus, a welding transformer, a source of current, means for connecting the primary of the transformer to the source, means for controlling the operation of the first named means, said second named means comprising a manually controlled switch, a second switch and timing means for causing the operation of the second switch, the parts being constructed and arranged so that both of said switches must be closed at the same time to cause the operation of the first named means, and means for maintaining the first named means in operated condition regardless of the position of the first or second switches, said third named means comprising a third switch, the operation of which is caused by said timing means.

2. In preheating and welding apparatus, a preheating and welding transformer, a source of current, means for connecting the primary of said transformer to said source at a reduced voltage for preheating, means for controlling the operation of the first named means, said second named means comprising a manually controlled switch, a second switch and timing means for causing the operation of the second switch, the parts being constructed and arranged so that both of said switches must be closed at the same time to cause the operation of the first named means, means for maintaining the first named means in operated condition regardless of the position of the first or second switches, said third named means comprising a third switch, the operation of which is caused by said timing means, and means for increasing the voltage applied to the primary of the transformer for welding, said fourth named means comprising a fourth switch, the operation of which is caused by said timing means.

3. In an electric preheating and welding apparatus, preheating and welding electrodes, electric supply circuits therefor, a magnetically operable switch for controlling the supply circuit to the electrodes for preheating the material to be welded, a manually controlled electric circuit for operating said magnet switch, a timing device adapted to control the circuit for the magnet of said switch, and a holding circuit for said switch adapted to be closed by the closing of the switch itself, and said holding circuit adapted to be controlled by the timing device also.

4. In an electric preheating and welding apparatus, the combination of electric preheating and welding electrodes, supply circuits therefor, a magnet switch for controlling the supply circuit in the electric operation of preheating the material to be welded, an initially operable energizing circuit for the magnet of said switch, a self-holding circuit for said switch, a timing device adapted to control both said circuits, a second magnet switch for controlling the supply circuit in the welding operation of welding the material, and an operating circuit for the magnet of the second switch controlled by the self-holding circuit for the first mentioned magnet switch, and a timing device adapted to control the circuit for the magnet of said second magnet switch.

In testimony whereof, I have signed my name to this specification.

ARTHUR H. SCHLAF.